(12) United States Patent
Shifrin

(10) Patent No.: US 7,579,703 B2
(45) Date of Patent: Aug. 25, 2009

(54) HYDROELECTRIC IN-PIPE GENERATOR

(76) Inventor: Joseph Salvatore Shifrin, 78 Bricktop Rd., Windham, CT (US) 06280

( * ) Notice: Subject to any disclaimer, the term of this patent is extended or adjusted under 35 U.S.C. 154(b) by 0 days.

(21) Appl. No.: 12/154,171

(22) Filed: May 21, 2008

(65) Prior Publication Data

US 2008/0290663 A1    Nov. 27, 2008

Related U.S. Application Data

(60) Provisional application No. 60/931,564, filed on May 24, 2007.

(51) Int. Cl.
    *F03B 15/00*    (2006.01)
(52) U.S. Cl. ........................................ 290/52
(58) Field of Classification Search ............... 290/52
    See application file for complete search history.

(56) References Cited

U.S. PATENT DOCUMENTS

| | | | | |
|---|---|---|---|---|
| 1,962,384 A * | 6/1934 | Biggs | .................. | 415/33 |
| 2,436,683 A * | 2/1948 | Wood, Jr. | .................. | 290/52 |
| 3,750,001 A * | 7/1973 | McCloskey | .................. | 322/35 |
| 4,278,895 A | 7/1981 | Cros | | |
| 4,352,025 A * | 9/1982 | Troyen | .................. | 290/54 |
| 4,392,063 A * | 7/1983 | Lindquist | .................. | 290/54 |
| 4,555,637 A * | 11/1985 | Irvine | .................. | 290/52 |
| 4,629,904 A * | 12/1986 | Rojo et al. | .................. | 290/52 |
| 6,164,919 A * | 12/2000 | Vanmoor | .................. | 416/243 |
| 6,998,724 B2 | 2/2006 | Prevault | | |
| 7,357,599 B2 * | 4/2008 | Cripps | .................. | 405/75 |
| 7,372,172 B2 * | 5/2008 | Winkler et al. | .................. | 290/43 |
| 2007/0140829 A1 * | 6/2007 | Maillard De La Morandais | .................. | 415/4.1 |

* cited by examiner

*Primary Examiner*—Joseph Waks
(74) *Attorney, Agent, or Firm*—Robert L. Rispoli

(57) ABSTRACT

The present device provides an in-pipe turbine generator having a conduit, a plurality of runner blades positioned within the conduit, and a pitch adjustment mechanism whereby the pitch of the runner blades may be varied. The pitch adjustment mechanism further includes pitch adjustment screws that are positioned on a tangential flat on the master pitch adjustment bevel gear. Rotation of the pitch adjustment screw rotates the master pitch adjustment bevel gear thereby rotating the blade hub gears and the runner blades. Runner blade torque and angular velocity is transferred to a DC power generator and may be converted to AC power.

3 Claims, 3 Drawing Sheets

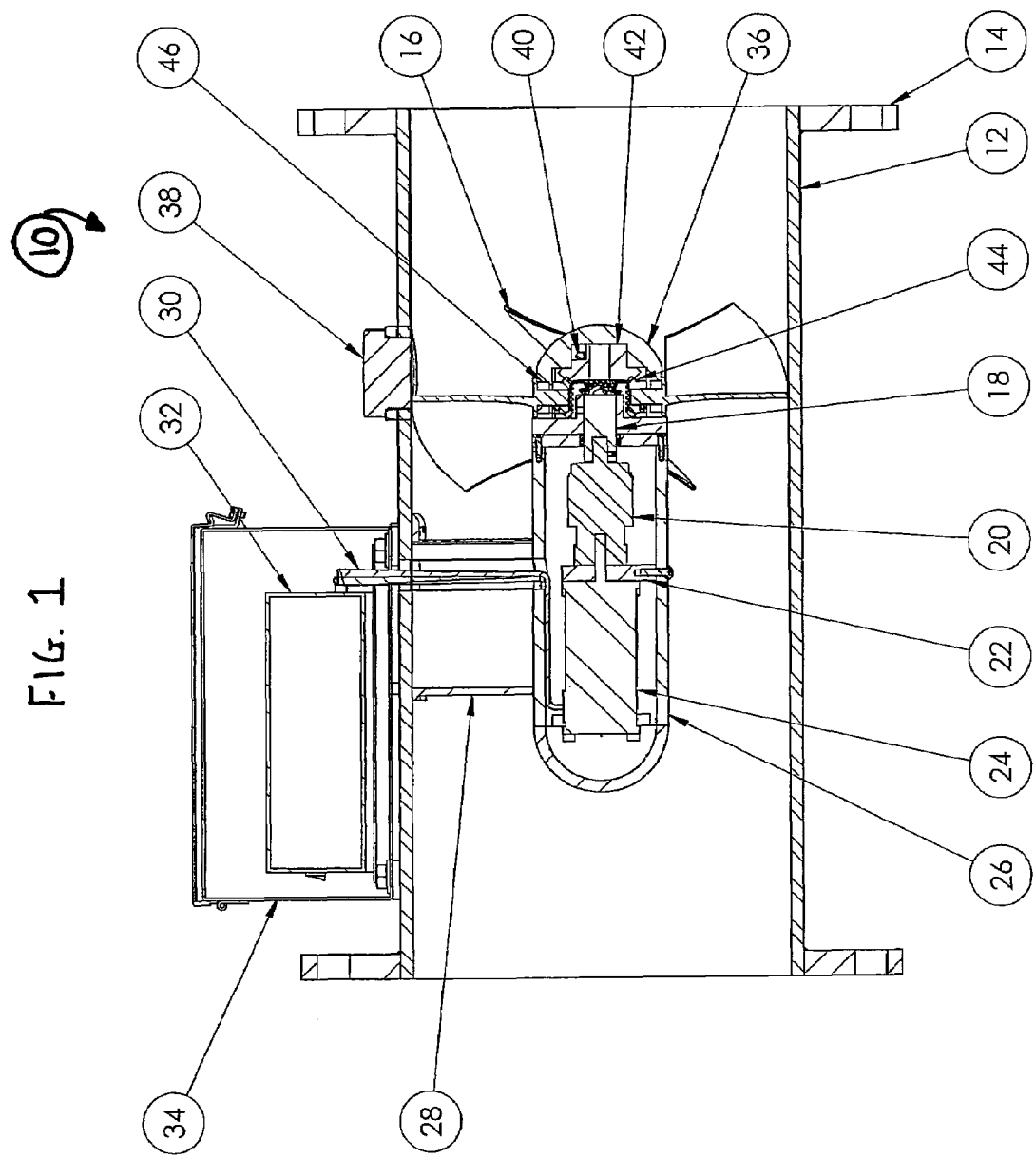

EXIT SIDE

SECTION

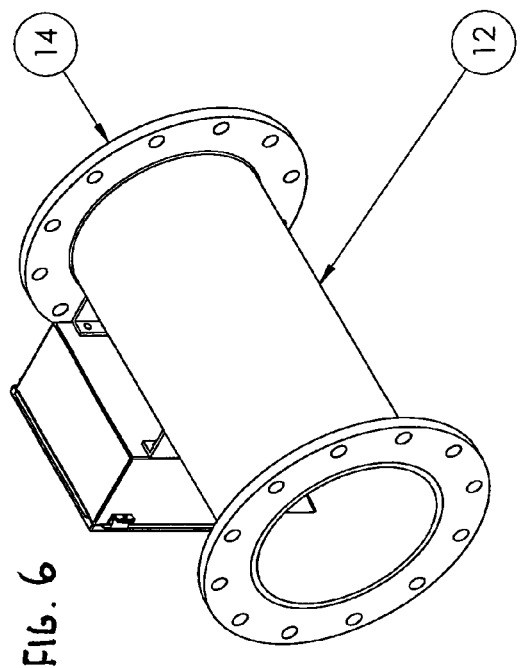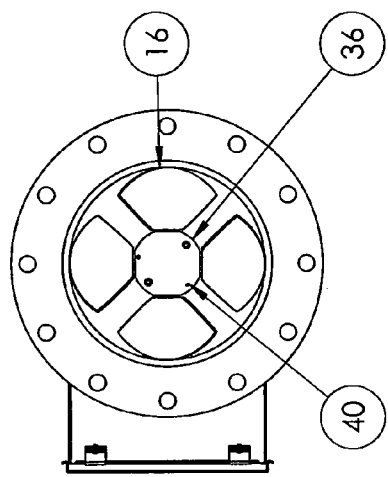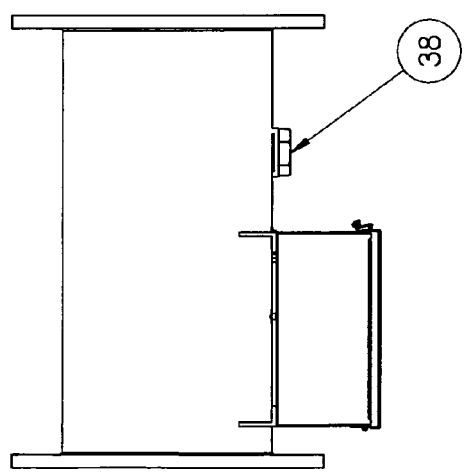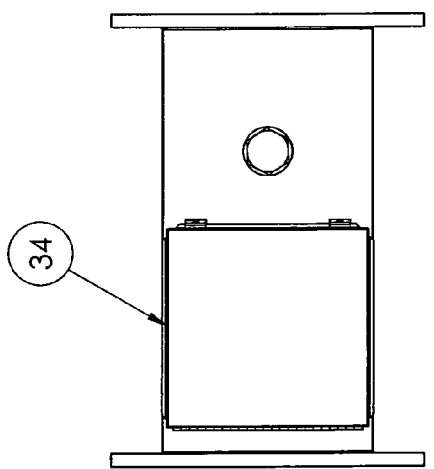

HYDROELECTRIC IN-PIPE GENERATOR

CROSS-REFERENCE TO RELATED APPLICATION

This application claims the benefit of U.S. Provisional Application No. 60/931,564 filed May 24, 2007.

BACKGROUND OF THE INVENTION

1. Field of the Invention

The present invention generally relates to a system and apparatus for generating electrical power. More specifically, this invention is directed to a turbine generator installed inside a pipe. The in-pipe turbine generator produces power from any moving fluid. It features an adjustable runner blade pitch, has an integrated control system, is capable of producing AC or DC output voltage and the runner speed is variable and not dependent on local power frequency.

The in-pipe turbine is suitable for a wide variety of flows and pressures and can be produced in a family of ANSI standard pipe sizes. Common ANSI standard pipe sizes include schedule 40 and schedule 80 size pipe. Typical locations for installation of the in-pipe turbine generator may include, but is not limited to: water treatment facilities; petroleum, pharmaceutical and other chemical processing facilities; manufacturing facilities; unloading fluid from ships, trucks, and trains; and any location where fluids are moved from one storage device to another. The in-pipe turbine generator can be fabricated from materials suitable for use with a variety of fluids including stainless steel, carbon steel, plastics and composites.

2. Brief Description of the Related Art

For large scaled industrial applications there are conventional turbine installations comprising turbines installed in a duct. U.S. Pat. No. 4,392,063 discloses one such turbine. The runner and the generator constitute a central section which is enclosed in a housing that is anchored in the duct by means of radial arms, the interior of which can be accessed by walking inside it for assembling and repair work. U.S. Pat. No. 4,392,063 also discloses that one of the radial arms is hollow and serves as an access shaft. This design has proven to be satisfactory in large turbine installations comprising a turbine installed in a duct; however, access to the central section becomes increasingly difficult as the size of the machine is decreased. For this reason, the conventional design of a turbine installed in a duct is not suitable for medium and small size installations.

This device disclosed in U.S. Pat. No. 4,392,063 provides a turbine installation that includes a turbine installed in a duct. This is accomplished by using interconnecting passages defined by two pipelines; each which contain multiple straight pipe sections. The turbine runner blades are housed in another chamber which converges with the carrying tubes to form a junction at the runner blade chamber. The driving water is fed to the runner blade chamber in two spaced apart pipelines.

Other prior art discloses additional types of turbine generators. For example, U.S. Pat. No. 4,629,904 discloses a small scale hydroelectric generator which utilizes a siphon-type method of intake and contains a remotely located hydraulic generator and hydraulic motor and pump. U.S. Pat. No. 4,555,637 discloses a high-speed turbo generator used in a shaft or conduit. U.S. Pat. No. 4,278,895 discloses a hydroelectric power station wherein the turbine runner is housed in a draft tube at the base of the power station dam and the draft tube is connected to a shaft. Lastly, U.S. Pat. No. 6,998,724 discloses a subsea level method of electrical power output. A turbine is operatively connected to the flow line submerged below sea level. The turbine being rotatable by fluid flowing through the flow line and in turn generating electrical output.

None of these prior art disclosures provide a small compact in-pipe turbine generator that can be run inside a single flow passage. It is therefore an object of the present invention to overcome this limitation in the prior art and to provide a small compact in-pipe turbine generator that can be run inside a single flow passage.

DESCRIPTION OF THE INVENTION

The present invention is designed to produce electrical power in any location where fluids are passing through pipes with "excess energy" available for extraction. This can include any location where there is a drop in fluid elevation such as where fluids are being pumped or dispensed from "piping" into a vessel or open air (i.e.; rivers, channel drums, barrels, tanks, etc), where fluids are moving through piping at pressures greater than that needed to "move" the fluid, and many other possible locations.

The turbine runner turns at variable speeds, and is fine tuned to optimize performance of the specific site by external adjustment of the runner blade pitch. The runner is allowed to turn at the most efficient rotary speed with electrical power being produced via either AC or DC generator. The power can be used directly as DC power, or passed through an electrical inverter that converts power to 60 hz AC.

The unit configuration is such that it is easily installed and tuned by persons with normal "plumbing" skills. The mounting is ANSI standard pipe flanges, can be installed in any existing plumbing scheme, either existing or new design. The configuration also allows for simple removal and replacement should that become necessary.

BRIEF DESCRIPTION OF THE DRAWINGS

FIG. 1 provides a sectional view of an in-pipe turbine generator in accordance with the present invention.

FIG. 4 provides a top view of the in-pipe turbine generator shown in FIG. 1.

FIG. 5 provides a top view rotated 90° of the in-pipe turbine generator shown in FIG. 1.

FIG. 6 provides an isometric view of the in-pipe turbine generator shown in FIG. 1.

FIG. 7 provides a side view of the in-pipe turbine generator shown in FIG. 1.

DETAILED DESCRIPTION OF THE INVENTION

Figure 3:
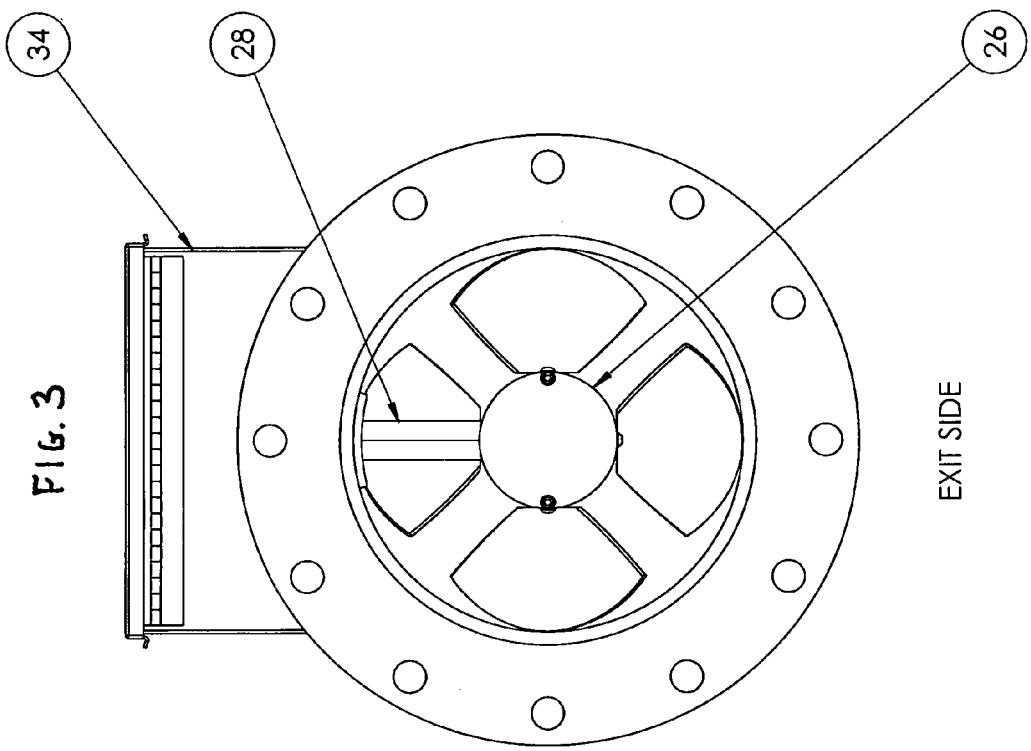
FIG. 3 provides a sectional view of the exit end of the in-pipe turbine generator shown in FIG. 1.
Figure 2:
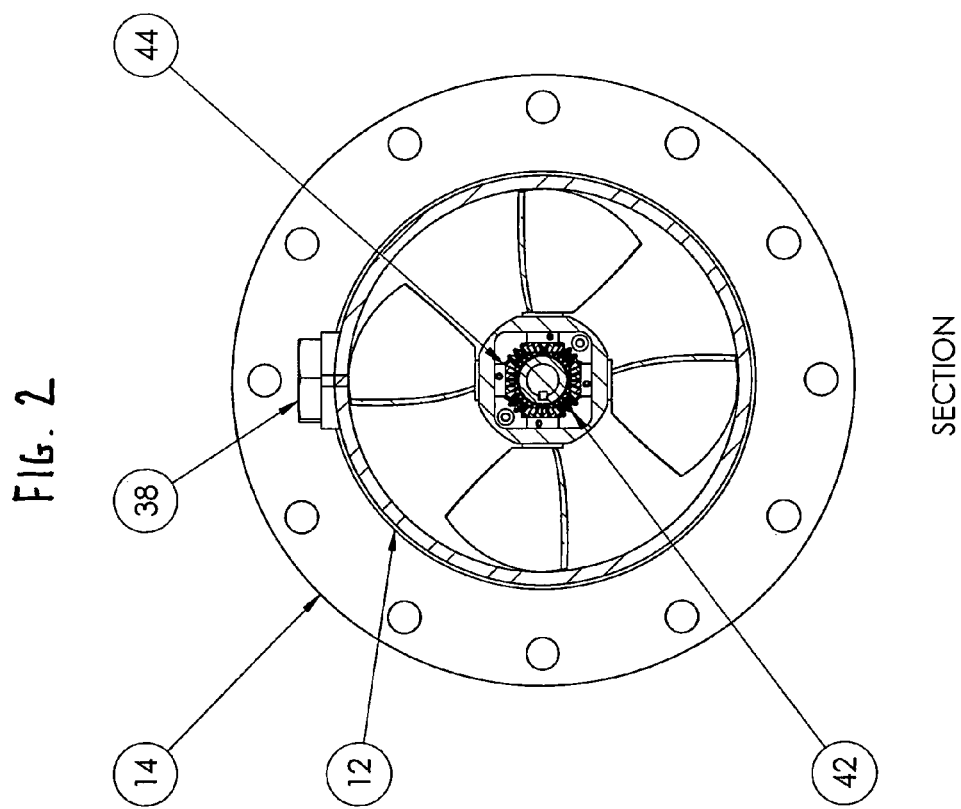
FIG. 2 provides a sectional view of the intake end of the in-pipe turbine generator shown in FIG. 1.

One embodiment of the hydroelectric in-pipe turbine generator 10 is depicted on FIG. 1. In-pipe turbine generator 10 is contained within a conduit 12 made of ANSI standard pipe and is mounted within a plumbing system by-way of industrial flange mounts 14. Fluid is allowed to flow into the conduit 12 and come in contact with the runner blades 16.

The fluid imparts kinetic energy to the runner blade 16 creating torque and giving it angular velocity which is then transferred to the generator coupling 18. The generator coupling 18 then transfers the torque and angular velocity to the gearbox reduction 20 where it is converted to an appropriate torque and RPM for the DC generator 24.

The DC generator 24 and reduction gearbox 20 are supported by the main generator support 22 housed in the generator/gearbox enclosure 26. The generator/gearbox enclosure 26 is supported by the radial support arm 28. Power produced by the generator is then transferred by way of the internal wiring 30 to the electrical inverter 32, housed in the electrical enclosure 34 as sown in FIG. 5, to be converted to AC power.

The pitch adjustment mechanism 36 is used to optimize each hydroelectric in-pipe generator to its specific application. This optimization is achieved by rotational movement in the angle of the runner blades 16. The pitch adjustment mechanism 36 is accessed by way of the pitch adjustment port 38 as shown in FIG. 4. The pitch of the runner blades 16 is then changed by tightening and loosening the two pitch adjustment screws 40 as shown in FIG. 7, wherein screws 40 rest against a tangential flat on the master pitch adjustment bevel gear 42. In doing so the master pitch adjustment bevel gear 42 rotates causing the four blade hub gears 44 which are keyed to the four runner blades 16 to rotate. Each runner blade 16 will therefore turn within its hub bearing 46, adjusting the pitch of the blades.

The in-pipe turbine generator of the present invention overcomes the shortcomings of the prior art by providing a novel mechanism for producing power from any moving fluid within a single pipe. Although the invention has been described in considerable detail with respect to particular embodiments of Applicant's device, it will be apparent that the invention is capable of numerous modifications and variations, apparent to those skilled in the art, without departing from the spirit and scope of the invention.

The invention claimed is:

1. An in-pipe turbine generator comprising:
   a) a conduit;
   b) a plurality of runner blades positioned within the conduit;
   c) a pitch adjustment mechanism positioned within the conduit and accessed through a port whereby the pitch of the runner blades may be optimized for a specific in-pipe turbine generator application by adjusting at least one pitch adjustment screw;
   d) a means for imparting kinetic energy to the runner blades creating torque and angular velocity comprising the passage of a fluid through the conduit; and
   e) a means for transferring torque and angular velocity to a DC power generator comprising a generator coupling, a gearbox reduction means, a DC generator, and a means for supporting the gearbox reduction means and the gearbox within the conduit.

2. The in-pipe turbine generator of claim 1 wherein power produced by the DC generator is converted to AC power.

3. The in-pipe turbine generator of claim 1 wherein the pitch adjustment mechanism further comprises:
   (i) a rotateable master pitch adjustment bevel gear comprising at least one tangential flat upon which the at least one pitch adjustment screw is positioned, and wherein the rotateable master pitch adjustment bevel gear rotates when the tangential flat is acted upon by the at least one pitch adjustment screw; and
   (ii) runner blade hub gears keyed to the runner blades wherein rotation of the at least one pitch adjustment screw rotates the master pitch adjustment bevel gear thereby rotating the blade hub gears and thereby turning each runner blade within a hub bearing adjusting the pitch of the runner blades.

\* \* \* \* \*